Jan. 18, 1966   R. M. BELL   3,230,092
PACKAGED BAKERY PRODUCT
Filed July 18, 1963

United States Patent Office 3,230,092
Patented Jan. 18, 1966

3,230,092
PACKAGED BAKERY PRODUCT
Rodney M. Bell, 228 Grandview Ave., Glen Ellyn, Ill.
Filed July 18, 1963, Ser. No. 296,008
1 Claim. (Cl. 99—171)

This invention pertains to the art of bakery products and more particularly to a bakery product with a novel container.

It has become common in the bakery art to provide frozen or cooled pastries, such as cakes, pies, etc., with aluminum or cardboard containers in which the pastry is cooked or heated before serving.

Such prior containers have been somewhat successful; however, it is difficult to remove the pastry from the container after the pastry has been heated. Consequently, a housewife must use various implements for removing the pastry from the container, and, often, the pastry is broken or otherwise damaged. In addition, it is necessary to find a separate plate or platter for receiving the pastry so that the pastry can be served without the use of the container itself which is often unsightly.

The present invention is directed toward an improvement in such a bakery product including a container and a pastry therein.

In accordance with the present invention there is provided a bakery product comprising a container having an upper and a lower portion, a bottom plate at the lower portion of the container and substantially integral with the container, a pastry within the container and resting on the plate, and a pull-off strip surrounding the container at the lower portion thereof and immediately above the plate whereby removal of the strip allows removal of the container from the pastry and the plate.

The primary object of the present invention is the provision of a bakery product including a container and a pastry therein wherein the pastry may be removed from the container without damage thereto.

Another object of the present invention is the provision of a bakery product as defined above wherein the container may be removed from the pastry with a portion of the container forming a serving plate for the pastry.

Yet another object of the present invention is the provision of a bakery product as defined above wherein the pastry may be separated from the container without the use of special implements.

These and other objects and advantages will become apparent from the following description used to illustrate the preferred embodiment of the present invention as read in connection with the accompanying drawing in which.

Figure 1:
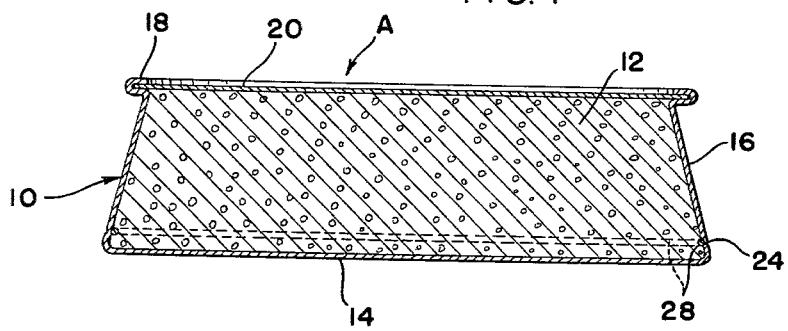
FIGURE 1 is a cross-sectional, somewhat schematic, side elevational view illustrating the preferred embodiment of the present invention.

Referring now to the drawing, wherein the showings are for the purpose of illustrating a preferred embodiment of the invention only and not for the purpose of limiting same, FIGURE 1 shows a bakery product A including an outer container 10 formed from any appropriate material such as aluminum or cardboard which container has therein a pastry 12, such as a cake, pie or similar item. In accordance with the illustrated embodiment of the present invention, the container has a bottom plate 14 upon which the pastry rests, side wall 16 and upper lip 18. The lip 18 is adapted to fold over a lid 20 to close the container with pastry 12 therein.

Figure 2:
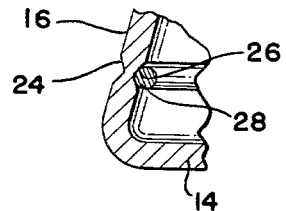
FIGURE 2 is an enlarged, fragmentary, cross-sectional view illustrating a portion of the preferred embodiment as disclosed in FIGURE 1.
Figure 3:
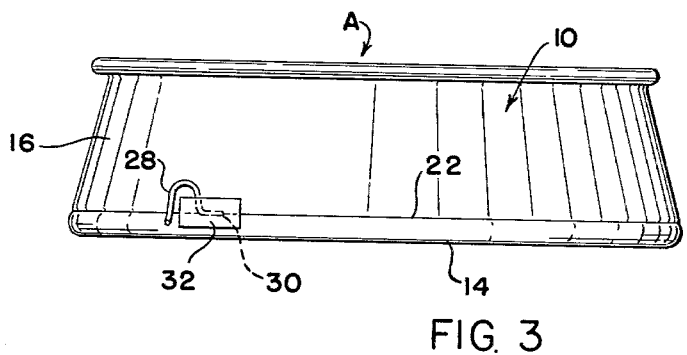
FIGURE 3 is a side elevational view illustrating the preferred embodiment of the present invention.

As so far described, the container 10 does not differ substantially from other containers, except the periphery of the side wall 16 may be slightly smaller at the lip 18 than at the bottom plate 14. In accordance with the present invention, as is best shown in FIGURES 2 and 3, the lower portion of the side wall 16 immediately above the bottom plate 14 is provided with a weakened wall portion surrounding the container which wall portion is indicated as line 22 in FIGURE 3. Although a variety of constructions could be utilized for weakening the wall 16 adjacent the plate 14, in accordance with the illustrated embodiment of the present invention, there is provided inner and outer indentations or scores 24, 26 as is best shown in FIGURE 2. Within the interior of the container and adjacent the weakened wall portion 22, there is provided a strip or band 28 which extends to the outside of the container through an opening 30 and is held in place against the side wall 16 by an adhesive strap 32. It is appreciated that the strip or band 28 may be secured onto the inside surface of wall 16 by adhesive or by a separate girdle band without departing from the intended spirit and scope of the present invention.

In operation, after the pastry 12 has been cooked or heated, the strap 32 is removed and the strip 28 is pulled radially outward from the container so that the side wall 16 is severed at line 22. Thereafter, the upper portion of the container 10 may be removed from the pastry 12 so that the pastry is not damaged while the container is lifted. It is possible to remove the lid 20 prior to lifting the container 10 from the pastry 12. In addition, lid 20 may be a permanent part of the container 10 so that it is removed from plate 14 with the upper portion of the container.

It is appreciated that various other arrangements could be provided for separating the container 10 from the bottom plate 14 without departing from the intended spirit and scope of the present invention as defined in the appended claim.

Having thus described my invention I claim:

A packaged bakery product of the type to be heated before eating, said product comprising a heat resistant container having a top, a peripherally extending side wall and a bottom plate having a contour matching said side wall periphery, said side wall and bottom plate being substantially integral, a pastry of the type to be heated within said container, said pastry resting on said bottom plate, a pull-off strip surrounding said container at said side wall and adjacent said bottom plate, said strip being conterminous with said bottom plate, said pull-off strip allowing removal of said top and most of said side wall from said bottom plate upon removal of said strip from said container, said container having a weakened wall portion surrounding said container in said side wall and immediately opposite said plate and means for securing said pull-off strip within said container immediately opposite said weakened wall portion so that removal of said strip severs said side wall around its complete periphery and at said weakened wall portion, and said side wall being tapered so that it has a smaller dimension adjacent the top than the dimension adjacent the bottom plate.

References Cited by the Examiner

UNITED STATES PATENTS

| | | |
|---|---|---|
| 1,684,421 | 9/1928 | Thompson. |
| 2,001,919 | 5/1935 | Nolte _____ 99—137 X |
| 2,684,807 | 7/1954 | Gerrish. |
| 2,741,414 | 4/1956 | Nottage. |
| 3,031,309 | 4/1962 | Bogner et al. _____ 99—171 |

FOREIGN PATENTS 740,655  11/1932  France.

A. LOUIS MONACELL, *Primary Examiner.*

RAYMOND N. JONES, *Examiner.*